United States Patent
Lacy

Patent Number: 6,083,542
Date of Patent: *Jul. 4, 2000

[54] FROZEN DESSERT FINGER FOOD

[76] Inventor: Jim Lacy, P.O. Box 355, Gladstone, Oreg. 97027

[ * ] Notice: This patent issued on a continued prosecution application filed under 37 CFR 1.53(d), and is subject to the twenty year patent term provisions of 35 U.S.C. 154(a)(2).

[21] Appl. No.: 09/021,786

[22] Filed: Feb. 11, 1998

Related U.S. Application Data

[60] Provisional application No. 60/037,132, Feb. 13, 1997.

[51] Int. Cl.$^7$ ........................................ A23G 9/00
[52] U.S. Cl. ........................ 426/95; 426/101; 426/249; 426/289; 426/565
[58] Field of Search ................ 426/95, 101, 104–289, 426/249, 565, 660

[56] References Cited

U.S. PATENT DOCUMENTS

| | | |
|---|---|---|
| D. 16,030 | 4/1885 | Schwarzschild et al. . |
| Re. 30,722 | 8/1981 | Olds . |
| D. 327,973 | 7/1992 | Copp . |
| 729,248 | 5/1903 | Yeager ..................... 426/249 |
| 1,214,168 | 1/1917 | Johnson . |
| 1,913,851 | 6/1933 | Oprean . |
| 2,085,495 | 6/1937 | Fulkerson . |
| 2,120,710 | 6/1938 | Nieding . |
| 2,404,177 | 7/1946 | Jetschmann ............... 426/95 |
| 2,489,129 | 11/1949 | Harrison . |
| 2,801,922 | 8/1957 | Oprean . |
| 2,925,347 | 2/1960 | Cummings et al. ........... 426/101 |
| 4,525,365 | 6/1985 | Kato . |
| 4,613,509 | 9/1986 | Ward et al. ................ 426/283 |
| 4,985,263 | 1/1991 | Klug . |
| 5,256,426 | 10/1993 | Tomioka et al. ............ 426/101 |
| 5,346,423 | 9/1994 | Caveza . |
| 5,480,335 | 1/1996 | Caveza . |

FOREIGN PATENT DOCUMENTS 187919  11/1922  United Kingdom .

OTHER PUBLICATIONS

Good Humor "Chololate eclair" ice cream cover sheet, 1998.

*Primary Examiner*—Milton Cano
*Assistant Examiner*—Hao Mai
*Attorney, Agent, or Firm*—Robert L. Harrington

[57] ABSTRACT

A frozen dessert such as ice cream that simulates the shape and color of french fried potatoes. The dessert is produced in elongate sections that have a small cross sectional area. Each section is coated on its exterior surfaces with an edible coating that serves to enhance the flavor of the dessert and to act as an insulating barrier. The coating permits a consumer to handle the individual sections with their fingers to enable consuming the dessert. The color of the coating simulates the color of french fried potatoes.

3 Claims, 2 Drawing Sheets

FROZEN DESSERT FINGER FOOD

This application is based on the provisional application titled ICE CREAM FRENCH FRIES, Ser. No. 60/037,132, filed Feb. 13, 1997.

FIELD OF THE INVENTION

This invention relates to frozen desserts such as ice cream and more particularly relates to thin strips of a frozen dessert coated with non-melting and insulative crumbs of a delectable food product, e.g., cookie crumbs, that permits the dessert to be handled by the fingers of an individual.

BACKGROUND OF THE INVENTION

Frozen desserts such as ice cream have long been a favorite of the consuming public. (Reference is hereafter made to ice cream but the reader will appreciate that this term encompasses other frozen desserts.) In one form ice cream is formed into bars with a protruding handle (stick) and covered with a flavored topping such as chocolate. Other forms have also been made including a thick slice of ice cream placed between two cookies or wafers. These forms provide a single portion quantity of ice cream and permit handling of the ice cream with the fingers of the consumer, i.e., the consumer is not restricted to a dish and spoon or cone to enjoy the ice cream.

A problem of such forms of "finger food" is that the bars are provided as a full portion and the consumer has to sequentially bite off bite-size portions and sinking one's teeth into a thick section of frozen ice cream is not always a pleasant experience.

BRIEF DESCRIPTION OF THE INVENTION

The present invention is a frozen dessert such as ice cream that has a shape and size that simulates the shape, size and color of french fried potatoes. Like french fried potatoes, a plurality of bite-size portions is cumulatively supplied as a full portion. The preferred form of the bite-size portion of the invention is an elongate member that is somewhat rectangular in shape and has a small cross sectional area. A coating that is non-meltable at room temperature such as crushed flavored wafers is applied to the exterior of the elongate members. The coating may be varied in color to simulate the color of french fried potatoes.

The small cross sectional area of the member does not provide a cold shock to the consumer as with other large frozen desserts. When consumed the coating combines with the ice cream to provide an unusual and appealing flavor to be enjoyed.

The coating provides an insulating barrier that retards the melting of the ice cream for a sufficiently long time to enable an individual to consume the full portion of dessert at his or her leisure. The coating allows the consumer to handle the dessert with his or her fingers without the undesired melting of the ice cream onto the hands. The coating also prevents the individual members from sticking together.

The size of the member provides a consumer the ability to select the amount of dessert desired. The consumer may consume one bite-size portion or as many as desired.

The invention will be further understood from the detailed description and the drawings.

DESCRIPTION OF THE PREFERRED EMBODIMENT

Figure 1:
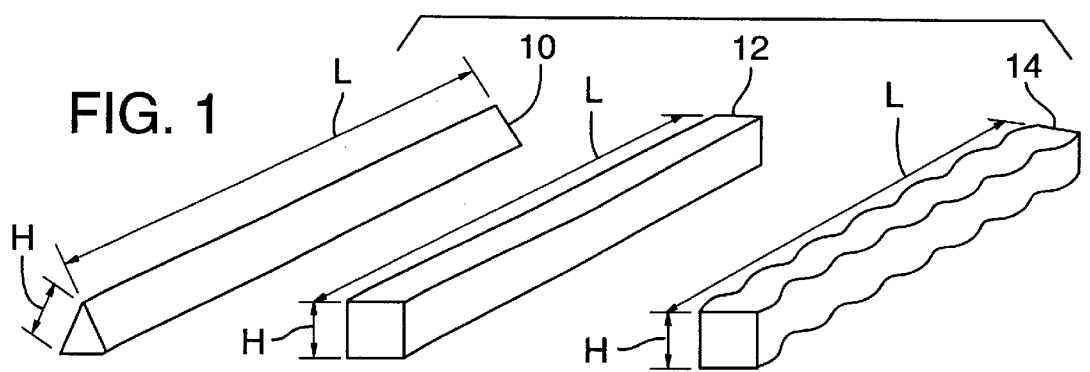
FIG. 1 is a view of multiple formed sections of ice cream.

Refer now to FIG. 1 of the drawings which illustrate formed sections (strips) of a frozen dessert. In this embodiment the formed sections are ice cream. It will be appreciated that other frozen desserts may be provided such as sherbert, frozen custard and the like. As shown there are examples of different shapes, an elongate triangular section 10, an elongate rectangular section 12 and an elongate rectangular section 14 having formed scallops along its length. It will be appreciated that other forms may be utilized. The members 10, 12, and 14 are generally of the size and shape of the well known french fried potato.

The dimension of the side edge of each section 10, 12 and 14 is preferably in the range of about 3/16 inch to 3/8 inch as indicated by arrow H and the length of each section 10, 12 and 14 is preferably in the range of about 1½ to 3 inches as indicated by arrow L.

Figure 2:
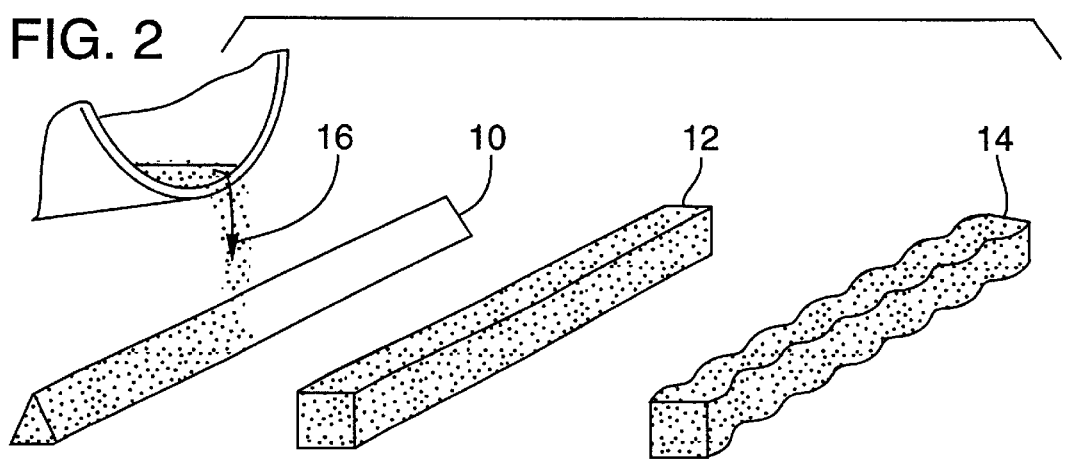
FIG. 2 is a view illustrating the application of a coating to the sections of FIG. 1.

FIG. 2 illustrates the sections 10, 12 and 14 being covered on their exterior surfaces by an edible coating 16. All of the exterior surfaces of the sections 10 12 and 14 are covered by the coating. The coating 16 is being dispensed from a receptacle. The coating 16 in this embodiment is produced by crumbling flavored cookies or wafers to a uniform consistency of fine granular like material. The coating 16 will readily adhere to the ice cream of the sections 10, 12 and 14. The thickness of the coating 16 may be varied. If required, a known edible binder may be added to the coating to insure that the coating 16 adheres to the sections 10, 12 and 14. The flavor of the sections 10, 12, 14 and the coating 16 are selected to complement each other to provide an enjoyable taste combination. A vanilla flavored ice cream section 10 may for example be coated with a chocolate flavored coating 16. There are unlimited flavors available for both the sections 10, 12, 14 and the coating 16.

Figure 3:
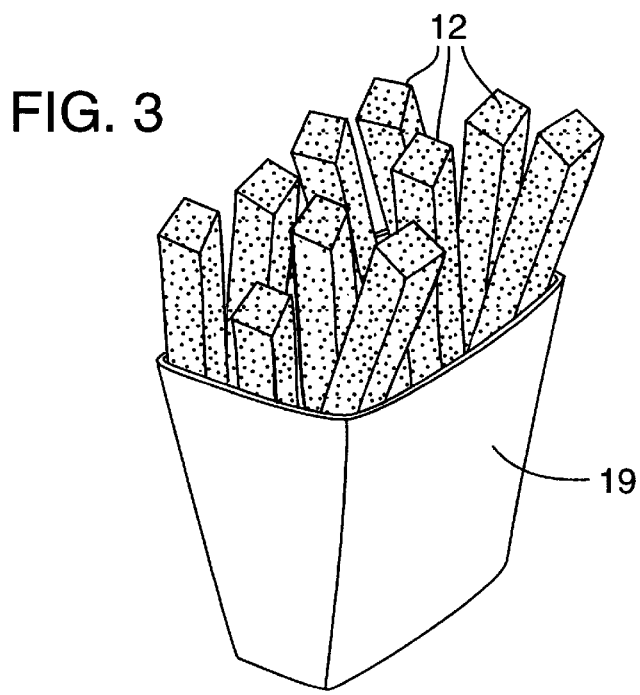
FIG. 3 is a view illustrating an example of one manner of serving the coated sections of FIG. 2.
Figure 4A:
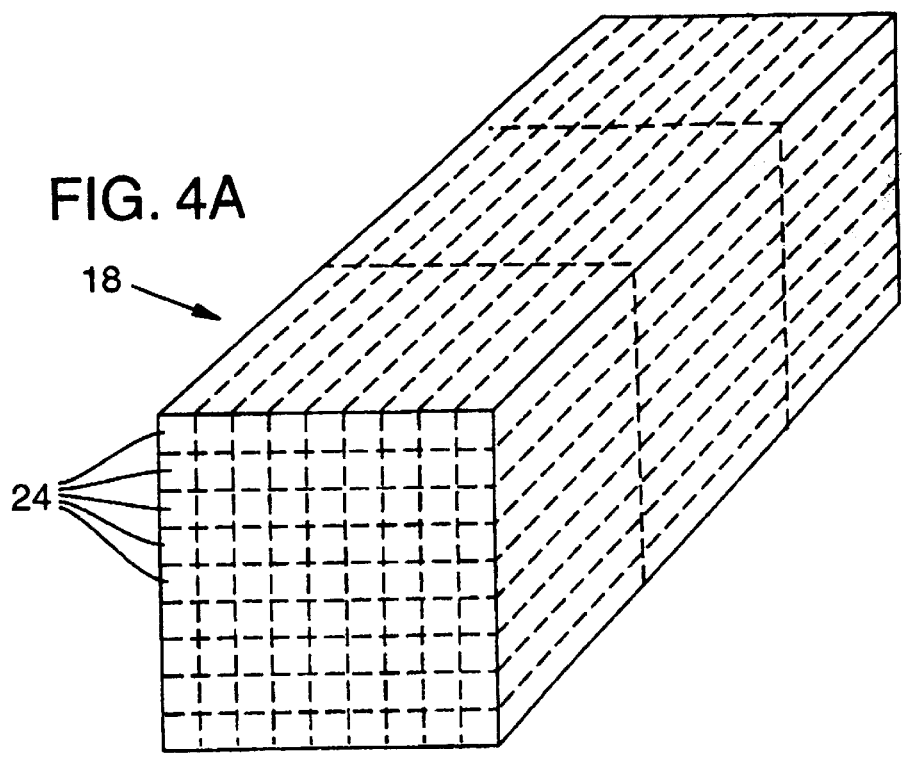
FIGS. 4A–4D illustrate an example of a process used to produce the preferred embodiment of the invention.
Figure 4C:
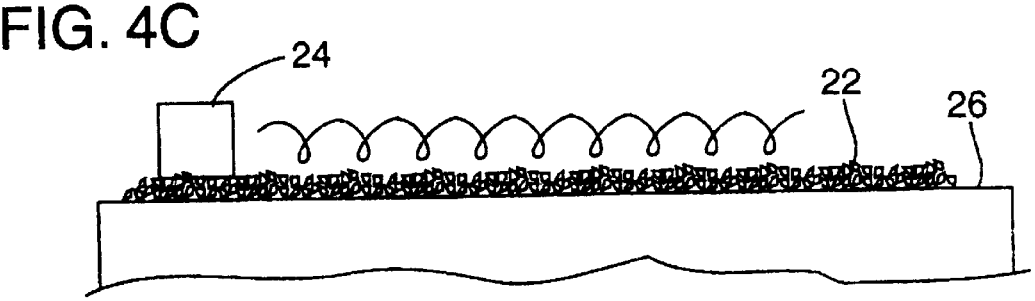
Figure 4B:
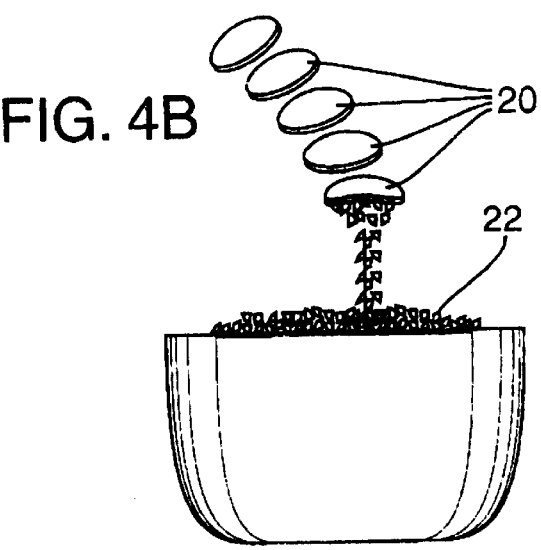
Figure 4D:
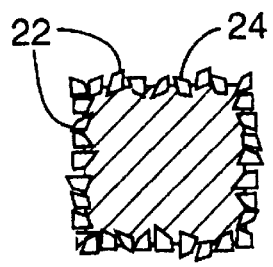

FIGS. 4A–4D illustrate a specific process used to produce the finger food of FIG. 3. FIG. 4A illustrates a block of ice cream 18, e.g., a gallon size of ice cream cut into small strips 24, e.g., ¼ inch width square by 2 inches long. FIG. 4B illustrates vanilla wafers 20, e.g., Nabisco bran "Nilla" wafers being crumbled into small particles 22. FIG. 4C illustrates the particles 22 placed on a table top surface 26 and the strips 24 being rolled over the particles 22 to partially embed the particles into the surface of the ice cream. FIG. 4D is a cross section of a strip 24 coated with the particles 22 to provide the coated section 12 of FIG. 3. Whereas the process of FIG. 2 is intended to generally illustrate the process, it will be appreciated that some embedding of the particles into the ice cream surface is desired. The process of FIG. 4 specifically achieves such embedding of the particles but other methods are contemplated, i.e., the ice cream may be softened somewhat prior to pouring the particles 16 or some form of spray coating of the particles may be used to achieve the embedding.

The color of the coating 16 may be varied to simulate the color of the well known french fried potato. As is known, the french fried potato varies in its color from a light color to a deep golden brown. The coating 16, by varying known ingredients can be produced to simulate the desired color.

The size range of the sections 10, 12 and 14 produced in the preferred size range provides for a ratio of coating to ice cream that provides a unique taste experience. The small cross sectional area of the sections 10, 12 and 14 when coated with the coating 16 is believed to reduce the cold shock to the mouth and particularly the teeth. The small portions may be placed directly in the mouth or a portion of the "french fry" may simply be readily broken off. The small dimension of the ice cream sections tends to produce rapid melting when placed in the mouth and the coating blends with the ice cream to provide a balance of the two ingredients that are uniquely pleasant to the taste.

FIG. 3 illustrates one manner of serving the sections 10, 12 and 14. As illustrated a container 19 in the shape of an envelope is provided to serve the ice cream. The coating 16 which adheres to the exterior of the sections provides an insulating barrier that retards the melting of the ice cream and provides a surface which may be handled by an individual without the dessert melting in the hand. The portion size may be adjusted to accommodate the desire of the consumer. The consumer may be satisfied with only one section of ice cream or may desire multiple sections. This is believed to be especially advantages when serving a small child for example. A consumer will simply grasp a section received in the container 19 by his or her fingers to consume the dessert.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A food product comprising:

in combination, a strip portion having an exterior surface area and an applied coating portion;

the combination strip and coating portions are sized and shaped to resemble french fries with a cross section dimension of about 3/16 inch to 3/8 inch and a length of about 1.5 inches to 3.5 inches;

said strip portion consisting of meltable frozen confection and the coating portion consisting of flavored edible particles having a consistency of fine granular material applied over the entire surface area of the strip portion and partially embedded in the strip portion, said particles being non-meltable at room temperature so as to insulate and contain the frozen confection; and said food product being bite size and packaged to contain multiple strips as a frozen food product, each of said strips and coating thereon individually readily insertable in its entirety into a consumer's mouth upon consumption.

2. A food product as defined in claim 1 wherein the strip portion is ice cream.

3. A food product as defined in claim 2 wherein the edible particles providing the coating portion are selected from one of a crumbled cookie and a crumbled wafer.

* * * * *